US010089399B2

(12) United States Patent
Gadepalli et al.

(10) Patent No.: US 10,089,399 B2
(45) Date of Patent: Oct. 2, 2018

(54) SEARCH TOOL ENHANCEMENT USING DYNAMIC TAGGING

(71) Applicant: International Business Machines Corporation, Armonk, NY (US)

(72) Inventors: Venkata V. Gadepalli, Apex, NC (US); Trudy L. Hewitt, Cary, NC (US); Ashok K. Iyengar, Encinitas, CA (US); James M. Moreno, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/687,563

(22) Filed: Aug. 28, 2017

(65) Prior Publication Data

US 2018/0068025 A1 Mar. 8, 2018

Related U.S. Application Data

(63) Continuation of application No. 15/257,368, filed on Sep. 6, 2016.

(51) Int. Cl.
*G06F 17/30* (2006.01)

(52) U.S. Cl.
CPC .... *G06F 17/30867* (2013.01); *G06F 17/3053* (2013.01); *G06F 17/30554* (2013.01)

(58) Field of Classification Search
None
See application file for complete search history.

(56) References Cited

U.S. PATENT DOCUMENTS

| 9,031,945 | B1 | 5/2015 | Baluja et al. |
| 9,195,715 | B1 | 11/2015 | Ngo et al. |
| 9,195,749 | B2 | 11/2015 | Gras |
| 9,275,062 | B2 | 3/2016 | Janssen et al. |
| 9,298,828 | B1 | 3/2016 | Das et al. |
| 9,305,088 | B1 | 4/2016 | Zamir et al. |
| 9,405,834 | B1 | 8/2016 | Das et al. |
| 2003/0088544 | A1 | 5/2003 | Kan et al. |
| 2007/0174260 | A1 | 7/2007 | Bachman et al. |

(Continued)

OTHER PUBLICATIONS

Sep. 6, 2016, U.S. Appl. No. 15/257,368.

(Continued)

*Primary Examiner* — Jason G Liao
(74) *Attorney, Agent, or Firm* — Brian M. Restauro

(57) ABSTRACT

Embodiments of the present invention provide methods, program products, and systems to filter content returned by a search tool by associating an indication that content fulfills a first request, with the first request, the content that fulfills a first request for information, and other metadata associated with the indication. Embodiments can then add to a database the respectively associated first request for information, the content, and the other metadata and in response to receiving a second request that is related to the first request, identify the added content and additional content that fulfills the second request and compile a list of the added content and the additional content and manipulate the order of the compiled list based, at least in part, on metadata associated with the added content, the additional content identified from the database, and metadata stored in a customizable user profile.

1 Claim, 6 Drawing Sheets

(56) References Cited

U.S. PATENT DOCUMENTS

| | | | |
|---|---|---|---|
| 2008/0016040 A1* | 1/2008 | Jones | G06F 17/3064 |
| 2009/0228464 A1* | 9/2009 | Jones | G06F 17/30522 |
| 2010/0235311 A1 | 9/2010 | Cao et al. | |
| 2011/0191363 A1 | 8/2011 | Bell et al. | |
| 2013/0097143 A1 | 4/2013 | Shenoy et al. | |
| 2014/0280040 A1 | 9/2014 | Moxley et al. | |
| 2014/0324828 A1 | 10/2014 | Hanses et al. | |
| 2015/0161206 A1 | 6/2015 | Waltermann et al. | |
| 2015/0269261 A1 | 9/2015 | Bennett | |
| 2016/0041986 A1 | 2/2016 | Nguyen | |
| 2016/0048561 A1* | 2/2016 | Jones | G06F 17/30477 707/722 |

OTHER PUBLICATIONS

Gurumurthy et al.; "Method and System for Sharing Search Queries and Search Results"; An IP.com Prior Art Database Technical Disclosure; IP.com No. IPCOM000210142D; IP.com Electronic Publication Date: Aug. 26, 2011; pp. 1-2.

IBM; "Tag Recommendation and Automatic Completion for Items with Lexicon Content"; An IP.com Prior Art Database Technical Disclosure; IP.Com No. IPCOM000186008D; IP.Com Electronic Publication Date: Aug. 5, 2009; pp. 1-2.

Pahal et al.; "Ontology Driven Contextual Tagging of Multimedia Data"; 2014 IEEE International Conference on Multimedia and Expo Workshops (ICMEW); Jul. 14-18, 2014; 6 Pages; IEEE.

Rehan; "Samsung Galaxy S3: How to Add Contextual Tag in the Photo"; Inside Galaxy; Oct. 9, 2013; 4 Pages;<http://inside-galaxy.blogspot.com/2013/10/samsung-galaxy-s3-how-to-add-contextual.html>.

Ronen et al.; "Social Networks and Discovery in the Enterprise (SaND)"; SIGIR'09; Jul. 19-23, 2009; p. 837; Boston, Massachusetts; ACM; <http://researchweb.watson.ibm.com/haifa/dept/imt/papers/ronenSIGIR09.pdf>.

Yahia et al.; "Efficient Network Aware Search in Collaborative Tagging Sites"; PVLDB '08; Aug. 23-28, 2008; pp. 710-721; Auckland, New Zealand; ACM.

"SONAR—SOcial Networking ARchitecture"; IBM; Printed Aug. 29, 2016; 2 pages; <https://www.research.ibm.com/haifa/projects/imt/sonar/index.shtml>.

Gadepalli et al., "Search Tool Enhancement Using Dynamic Tagging", U.S. Appl. No. 15/257,368, filed Sep. 6, 2016, 33 pages.

Appendix P—List of IBM Patents or Patent Applications Treated as Related, Filed herewith, 2 Pages.

* cited by examiner

SEARCH TOOL ENHANCEMENT USING DYNAMIC TAGGING

BACKGROUND

The present invention relates generally to the field of search engine optimization, and more specifically to filtering search results provided by search engines.

Search engine optimization is the process of increasing the visibility of certain non-paid search results. Typically, non-paid results refer to search results which are generated by the search engine, as opposed to those results which third parties pay the search engine to display. There are a number of methods that search engines employ in order to increase the visibility of search results that are most relevant to a given query. In general, a "query" refers to a request for information posed to a search tool. In general, a "search tool" is a program used to identify items in a database that correspond to a query. For example, a search tool can be a web search engine that receives a query and returns information found on the web. In some instances, optimization methods employed by a search engine include selecting search results that contain text matching the query. In other instances, a search engine can prioritize search results from sources on the web it considers trustworthy.

SUMMARY

Embodiments of the present invention provide methods, computer program products, and systems to filter content returned by a search tool by allowing users to tag search results deemed useful, and utilize these tagged searches to influence the display of future search results. In one embodiment, a method is providing comprising: in response to receiving an indication that content fulfills a first request for information, associating the first request for information with the content that fulfills the first request and other metadata associated with the indication; adding to a database the respectively associated first request for information, the content, and the other metadata; in response to receiving a second request for information that is related to the first request, identifying, from the database, the added content and additional content that fulfills the second request; compiling a list of the added content and the additional content; and manipulating the order of the compiled list based, at least in part, on metadata associated with the added content, the additional content identified from the database, and metadata stored in a customizable user profile.

DETAILED DESCRIPTION

Embodiments of the present invention recognize the problem of filtering search results in order to achieve those with the most useful information. In general, the difficultly of achieving the most useful search results stems from the potentially vast amount of content available in a given database. Although search engines employ sophisticated algorithms to determine what web content to display in response to a search, content deemed more useful by the user may not be among the first few search results returned by the search engine. In addition, the user may need to follow a series of links on a single website before finding the most useful content. Embodiments of the present invention provide a solution to further filter the content returned by a search tool. As described in greater detail later in this specification, embodiments of the present invention filter content returned by a search tool by allowing users to tag search results deemed useful, and utilize these tagged searches to influence the display of future search results.

Figure 1:
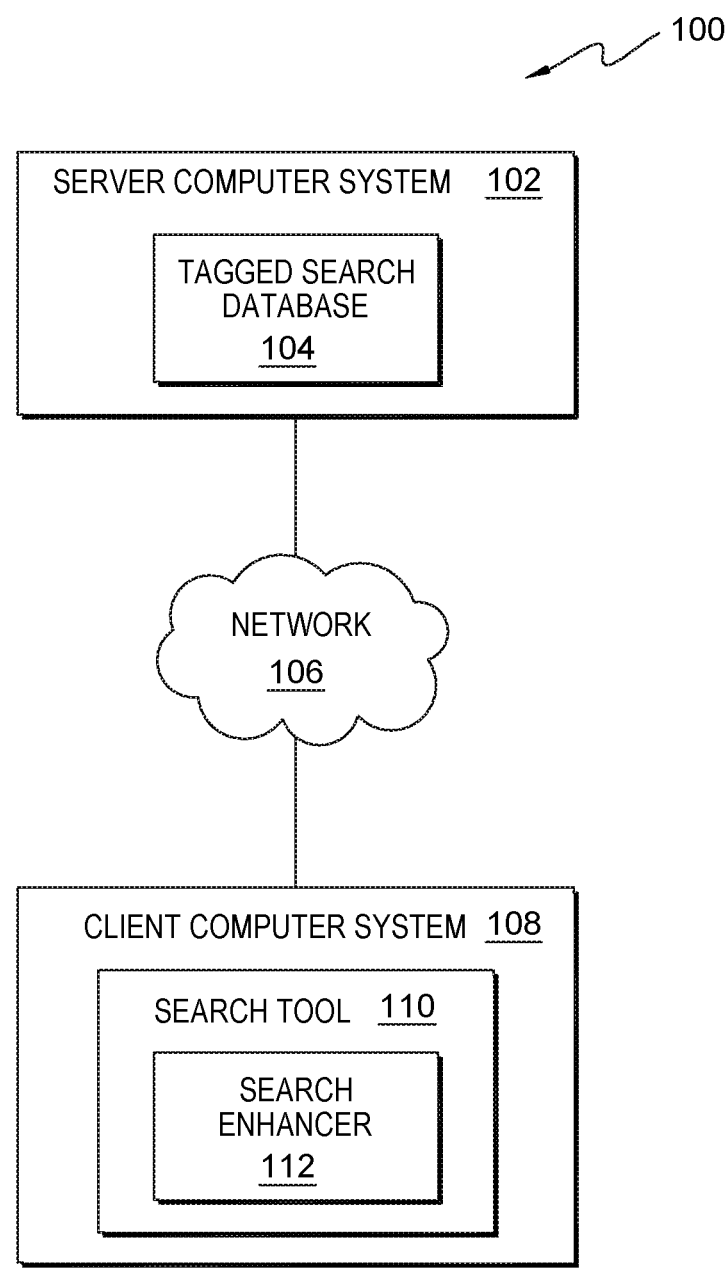
FIG. 1 is a block diagram of a computing environment, in accordance with an embodiment of the present invention.

FIG. 1 is a block diagram of computing environment 100, in accordance with an embodiment of the present invention. Computing environment 100 includes server computer system 102 and client computer system 108. Server computer system 102 and client computer system 108 can be desktop computers, laptop computers, specialized computer servers, or any other computer systems known in the art. In certain embodiments, server computer system 102 and client computer system 108 represent computer systems utilizing clustered computers and components to act as a single pool of seamless resources when accessed through network 106 For example, such embodiments may be used in data centers, cloud computing, storage area network (SAN), and network attached storage (NAS) applications. In certain embodiments, server computer system 102 and client computer system 108 represent virtual machines. In general, server computer system 102 and client computer system 108 are representative of any electronic devices, or combination of electronic devices, capable of executing machine-readable program instructions, as described in greater detail with regard to FIG. 6.

Client computer system 108 includes search tool 110. Search tool 110 can be any program used to sort through data in order to identify search results relevant to a query. A query, as used herein, refers to a string of characters or terms pertaining to a particular subject area that is of interest and indicates a request for information. In general, a "search result", as used herein, refers to electronic content displayed by search tool 110 or search enhancer 112 that is retrieved based on a search query (i.e., a request for information) and can include webpages, applications, PDFs, images, video, audio, holograms, and data processed document, and is used interchangeably with "content". Search tool 110 can be, for example, a web search engine used to search the internet for web content that corresponds to a query specified by a user. Search tool 110 is responsible for generating search results that can then be tagged via search enhancer 112, as described in greater detail below.

Search tool 110 includes search enhancer 112. Search enhancer 112 is responsible for interfacing with database 104, tagging search results and queries, associating the tagged search results and tagged queries with user-specific metadata (also referred to as metadata associated with the tagger), and identifying the tagged search results and tagged queries in database 104. Search enhancer 112 communicates with database 104 via network 106.

A "tagged search result", as used herein, refers to content, or user-specified sections of content, stored in database 104 after an indication from a user that the content or sections of the content fulfills a request for information (i.e., a query). In general, a tagged search result refers to content that has user-generated metadata associated with it. For example, a tagged search result can be a webpage, but also a section of a webpage. As another example, a tagged search result can be a video, but also a portion of a video between two user-specified times within the video.

In this embodiment, a "tagged query" refers to a query stored in database 104 that is associated with its respective tagged search results. In general, queries are automatically associated with the tagged search results, that is, the query entered is automatically associated with content that a user has tagged. In other embodiments, users can "tag" a query by marking, or otherwise indicating, the query corresponds to a search result or a tagged search result. For example, User A presents a query for "new sedans". The query is searched for and, upon receiving a search result (e.g., Website 1), User A flags specific portions of Website 1 relevant to the user's query for "new sedans". Following this example, the corresponding query (i.e., "new sedans") is linked with the tagged search result (i.e., the specific portions of Website 1) and both are added to database 104.

In this embodiment, database 104 also stores metadata associated with a tagger (i.e., a user that tags queries and search results). For example, metadata associated with the tagger that is stored in database 104 includes the social media outlets that the tagger is a member of, the time and date that the tagger tagged the search result, the geographical location where the tagger tagged the search result, the demographics of the tagger, and the perceived credibility of the tagger. In this embodiment, database 104 can also store a number of users who have tagged any given tagged search result.

In this embodiment, where a user has tagged a search result and corresponding query (i.e., indicated that a search result or a portion of the search result fulfills a request for information associated with the received query) search enhancer 112 updates database 104 by adding the tagged search result and the corresponding query to database 104 or by updating an existing tagged query and the associated search result.

Figure 2:
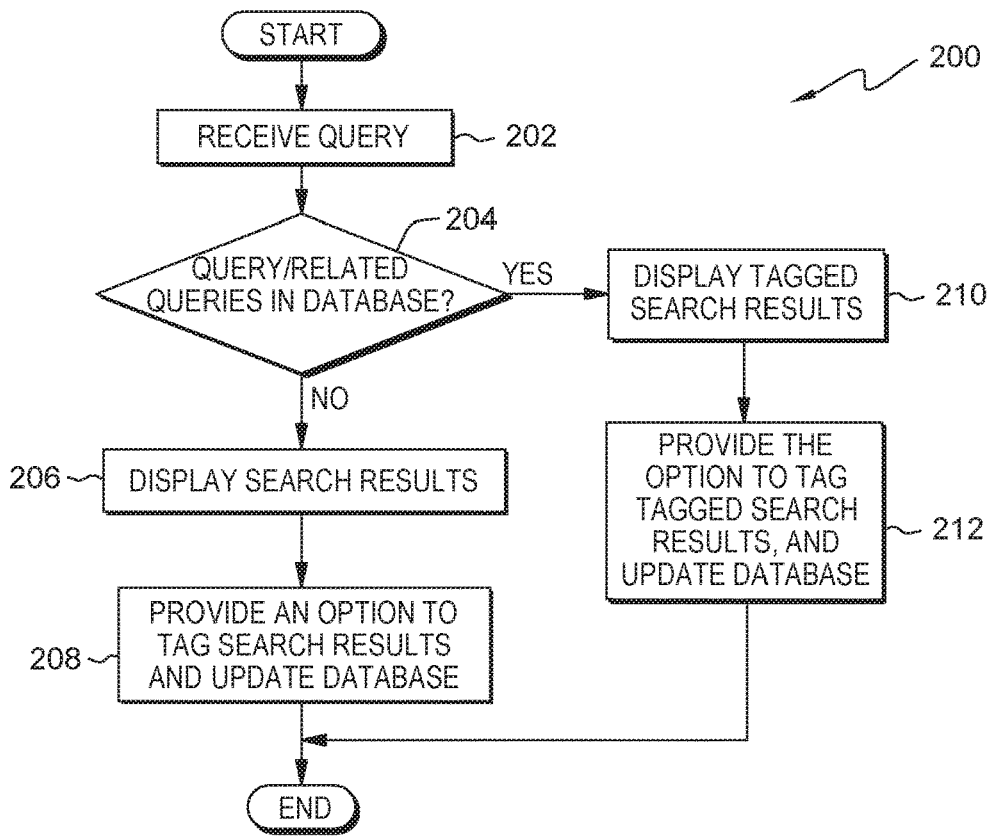
FIG. 2 is a flowchart illustrating operational steps for tagging and displaying search results, in accordance with an embodiment of the present invention.

Search enhancer 112 can, in response to receiving a user query, identify and retrieve tagged queries and their respective tagged search results stored in database 104 by generating a list of requests for information that are related to the user query, and searching database 104 for entries that match the user query as well as the generated list of requests for information, as discussed, in greater detail with regard to FIG. 2.

Search enhancer 112 can then organize the tagged queries and their respective tagged search results stored in database 104 for display according to user preferences that are stored in a customizable user profile. Herein, "user preferences" refer to user-specified metadata that includes the user's preferred content display scheme, as discussed further with regards to FIG. 3, and is used interchangeable with "user's preferences". Herein, a "customizable user profile" is a user-specific database that stores user preferences as well as metadata about the user such as user's social media outlets, geographical location, age, and occupation. In this embodiment, once organized, tagged search results can be displayed in any manner suitable for consumption. For example, tagged search results can be displayed via an ordered list of web links that lead to the tagged search result. In another embodiment, where applicable, tagged search results can be displayed as a collection of images compiled into a document format. As mentioned previously, a "tagged search result", as used herein, refers to content, or user-specified sections of content, stored in database 104 after an indication from a user that the content or sections of the content that fulfills a request for information (i.e., a query). In this embodiment, user preferences can be stored on either the client side (e.g., client computer system 108 on settings associated with search tool 110) or in a cloud/server side environment (e.g., server computer system 102) that is connected to client computer system 108 via a network connection (e.g., network 106) to search tool 110.

Network 106 can be, for example, a local area network (LAN), a wide area network (WAN) such as the Internet, or a combination of the two, and include wired, wireless, or fiber optic connections. In general, network 106 can be any combination of connections and protocols that will support communications between server computer system 102 and client computer system 108, in accordance with a desired embodiment of the invention.

Server computer system 102 includes database 104. Database 104 can store tagged search results, tagged queries, and metadata associated with the tagger. In general, database 104 can be implemented using any non-volatile storage media known in the art. For example, database 104 can be implemented with any suitable storage architecture known in the art, such as a relational database, an object-oriented database, and/or one or more tables. Database 104 can also store information associated with a tagged website such as size and/or content, date last updated, author information, etc.

For illustrative purposes, the following discussion is made with respect to database 104 residing on server computer system 102 and search enhancer 112 residing on client computer system 108. However, it should be understood that database 104 can reside on the same computer system as search enhancer 112 (e.g., client computer system 108), and that search enhancer 112 can reside on the same computer system as database 104 (e.g., server computer system 102).

FIG. 2 is a flowchart 200, illustrating operational steps for tagging and displaying search results, in accordance with an embodiment of the present invention. As previously mentioned, herein, a "search result" refers to electronic content displayed by search tool 110 or search enhancer 112 that is retrieved based on a search query (i.e., a request for information) and can include webpages, applications, PDFs, images, video, audio, holograms, and data processed document, and is used interchangeably with "content". In contrast, a tagged search result refers to a search result, or portion of a search result, stored in database 104 that has user-generated metadata associated with it, indicating the tagger perceives the search result to be relevant to a query.

In step 202, search enhancer 112 receives a query from search tool 110. In this embodiment, search enhancer 112 receives the query from search tool 110 via network 106. In other embodiments, the query can be received as input directly to search enhancer 112. An example of a query received by search enhancer 112 can be the phrase "restaurants near me." In other embodiments, search enhancer 112 can receive a query from one or more other components of computing environment 100.

In step 204, search enhancer 112 determines whether the received query, or any related queries, are present in database 104. In this embodiment, search enhancer 112 searches database 104 for a tagged query matching the received query and for other previously tagged queries (also stored in database 104) related to the received query. To determine if database 104 contains tagged queries that are related to the received query, search enhancer 112 generates a list of queries that are related to the received query using natural language processing techniques. For example, given the received query is "restaurants near me", search enhancer 112 can generate a list of queries related to this query, such as "new restaurants near me", "diners near me", and "delivery near me." Search enhancer 112 can then search database 104 for the received query and the three generated queries previously mentioned. Examples of natural language processing techniques include sentence splitting, tokenization, POS tagging, chunking, dependency parsing, anaphora resolution, etc. Search enhancer 112 can then search database 104 for tagged queries (and thus their respective tagged search results) that match the received query or queries on the generated list of related queries.

If, in step 204, search enhancer 112 determines that the received query, or any related queries, are present in database 104, then in step 210 (i.e., the YES branch), search enhancer 112 displays the tagged search results associated with the received query, and any related queries. In this embodiment, search enhancer 112 displays the tagged search results according to its ranking and display schema. In this embodiment, search enhancer 112 displays the tagged results via client computer system 108 (e.g., using display 622 discussed in FIG. 6), as described in greater detail with regard to FIG. 3. Continuing the example above, given the received query is "restaurants near me" search enhancer 112 can display tagged URLs of restaurant webpages, tagged images of restaurant menus, or tagged videos of restaurant advertisements.

In step 212, search enhancer 112 provides an option to tag the displayed tagged search results. In this embodiment, the tagged search results can be tagged, marked, or otherwise indicated by the user that certain portions of the tagged search results are of interest to the particular user. In this embodiment, tagged searched results can be tagged with the use of a graphical button. In this embodiment, the graphical button or buttons can be any shape or color and can be selected with the use of a computer mouse. In other embodiments, the graphical button can be selected by any other method used to select an option on a computer system such as by touch-selection (e.g., using a touchscreen) or voice-selection (e.g. using a microphone). In response to the graphical button being selected, search enhancer 112 provides an option to tag part of the search result, as discussed in greater detail with regard to FIG. 4C. In this embodiment, the query, and generated related queries, are added to database 104 along with the tagged search result.

For example, where the received query is for a rose blooming. A search result returned could be a five-minute video clip of a rose blooming. The user can use the graphical buttons to tag the video and mark that the relevant footage actually displaying the rose blooming is from one minute and five seconds to one minute and thirty seconds.

In instances where the search result for a rose blooming is a text document, the user can use the graphical buttons to tag the document and mark that the relevant portions for a rose blooming are found in "Section II".

In this embodiment, search enhancer 112 also adds metadata relating to the tagger to database 104. As mentioned previously, database 104 can store metadata such as the social media outlets that the tagger is a member of, the time and date that the tagger tagged the search result, the geographical location where the tagger tagged the search result, the demographics of the tagger, and the perceived credibility of the tagger.

For example, in response to tagging a search result that fulfills the query "restaurants near me", search enhancer 112 can also add metadata such as the time the search result was tagged and the geographical location of the tagger. In this example, the time that the search result was tagged can help a subsequent user find restaurants serving a particular meal (e.g., breakfast instead of dinner). In this example, the geographical location associated with the tagged search result can better help a subsequent user find restaurants that have been confirmed to be nearby.

If, in step 204, search enhancer 112 determines that the received query, or any related queries, are not present in database 104, then in step 206 (i.e., the NO branch), search enhancer 112 displays search results that are returned by the search tool's algorithms. In other words, search enhancer 112 displays results generated by search tool 110 without the use of search enhancer 112. For example, given that the query "restaurants near me", and its related queries, are not present in database 104, search enhancer 112 can return the search results of a search tool such as a typical web search engine.

In step 208, search enhancer 112 provides an option to tag search results and add the tagged search results to database 104. In this embodiment, search enhancer 112 provides an option to tag search results via one or more graphical buttons, as previously discussed with regard to step 212.

Figure 3:
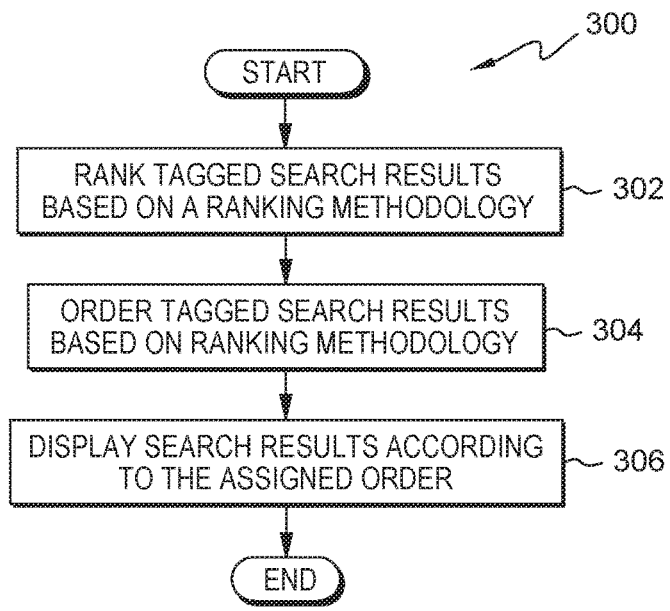
FIG. 3 is a flowchart, illustrating operational steps for displaying tagged search results, in accordance with an embodiment of the present invention.

FIG. 3 is a flowchart 300, illustrating operational steps for displaying tagged search results, in accordance with an embodiment of the present invention.

In step 302, search enhancer 112 ranks the tagged search results based on a ranking methodology. In this embodiment, search enhancer 112 ranks the tagged search results by consulting the user preferences and generating a list according to how closely the tagged search results adhere to the ranking methodology specified according to the user preferences. Search enhancer 112 ranks the tagged search results based on a numerical scheme were the tagged search result that adheres most closely to the specified ranking methodology is assigned a rank of "one", and appears first on the generated list, while the tagged search result that adheres least closely to the specified ranking methodology is assigned a rank matching to the number of tagged search results being ranked, and appears last on the generated list.

An example of a ranking methodology used by search enhancer 112 can be a ranking methodology that prioritizes tagged search queries and tagged search results based on the amount of tags associated with the search result. In other words, the search result that has been tagged the most amount of times by other users will be prioritized first, followed by the search result that has been tagged the second most amount of times will be prioritized second, and so on. For example, in instances where the user configures his or her user preferences to prioritize the display of tagged search results having been tagged the most amount of times, search enhancer 112 will return the tagged search result that has 50 tags associated with it over a tagged search result that has just five tags associated with it.

Another example of a ranking methodology used by search enhancer 112 can be a ranking methodology that prioritizes tagged search queries and tagged search results based on the most recently tagged queries and tagged search results. For example, in instances where the most recently tagged queries and tagged search results are selected, search enhancer 112 prioritizes the display of most recently tagged search results (i.e., the most recently tagged search result will be displayed first, followed by the second most recently tagged search result second).

Another example of a ranking methodology used by search enhancer 112 can be a ranking methodology that prioritizes tagged search queries and tagged search results based on the relationship between the user and the tagger. The relationship between the user and the tagger can be based on whether the two are connected through a social media outlet. For example, search enhancer 112 determines that User A and User B are connected through a social media outlet. Given this ranking methodology, if User A submits a query to search enhancer 112 and User B has tagged a search result related to that query, then User B's search result will be ranked higher than search results of other users who are not connected to User A through a social media outlet.

Another example of a ranking methodology used by search enhancer 112 can be a ranking methodology that prioritizes tagged search queries and tagged search results based on the credibility of the user who tagged a search result. For example, given this methodology, search results that were tagged by users deemed more credible will be ranked higher than search results tagged by users deemed less credible. Search enhancer 112 can determine a user's perceived credibility by taking into account factors such as how often the user tags search results and the number of the user's tagged searches that other users have tagged.

Another example of a ranking methodology used by search enhancer 112 can be a ranking methodology that prioritizes tagged search queries and tagged search results based on the user's demographics. For example, given this methodology if a user's demographic information coincides with a tagger's demographic information, the tagger's search results will be ranked higher than the search results of a tagger whose demographic information does not coincide with the user. Search enhancer 112 can determine two users' demographic similarity by taking into account factors such as age, occupation, and geographical location.

Another example of a ranking methodology used by search enhancer 112 can be a ranking methodology that prioritizes tagged search queries and tagged search results based on the user's previous queries and tags. For example, given this methodology, if a user has tagged search result from a certain web content provider, then search results from that provider will be ranked higher than search results from other providers.

In this embodiment, a user can configure his or her user preferences to consider multiple ranking methodologies. For example, a user can configure his or her user preferences to equally consider the methodology that prioritizes the display of most tagged search results and the methodology that prioritizes the display of most recently tagged search results. In this example, given these methodologies, search enhancer 112 generates two lists, one that considers the methodology that prioritizes the display of most tagged search results, and the other that considers the methodology that prioritizes the display of most recently tagged search results.

In step 304, search enhancer 112 orders the tagged search results based on the ranked search results. In this embodiment, search enhancer 112 orders the tagged search results by selecting tagged search results from the ranked search results according to the specified ranking methodology, or methodologies. In this embodiment, search enhancer 112 uses a numerical ordering system, starting at the number one and ending at the number of tagged search results being ordered.

In this embodiment, in instances where the user preferences specify a single ranking methodology, then search enhancer 112 orders the tagged search results to mirror the generated ranked list. For example, given a single ranking methodology, the assigned order would start with the first ranked tagged search result on the generated list, followed by the second highest ranked tagged search result, preceding in this manner until the last ordered search result, which would correspond to the last ranked tagged search result.

In this embodiment, where the user preferences specify multiple ranking methodologies, search enhancer 112 orders the tagged search results via an averaging scheme that considers each ranking methodology specified. For example, given two specified ranking methodologies search enhancer 112 can generate two lists, one to consider each specified ranking methodology. After generating these two lists, search enhancer 112 calculates the average of the two numerical ranks assigned to each tagged search result. Search enhancer 112 can then order the tagged search results according to the calculated averages. The tagged search result with the lowest calculated average is ordered first, while the tagged search result with the highest calculated average is ordered last. In the case where two tagged search results have the same calculated average, search enhancer 112 orders the tagged search result that was tagged most recently before the tagged search result that was tagged less recently. In other embodiments, the user can indicate other ranking methodologies through the user preferences to order tagged search results that have the same calculated average.

In yet other embodiments, other ranking methodologies can include prioritizing tagged search results from other users having similar interests to the user conducting the search (e.g., the searcher using search tool 110). In another example, tags can be identified according to social network (e.g., family friends, co-workers, etc.). In instances where the ranking methodology dictates tags from other users within the searcher's social network should be prioritized over tags associated with users outside the search's social network, search enhancer 112 can order the tagged search results to display tagged results from other users (i.e., taggers) within the searcher's social network.

In step 306, search enhancer 112 displays search results according to the assigned order. In this embodiment, search enhancer 112 can display the ordered search results in any manner suitable for consumption. For example, search enhancer 112 can generate a list that displays the ordered search results, that is, the generated list reflects the ordered search results of step 304. The generated list can also include a display of graphical icons displayed next to the tagged search result. The graphical icons can indicate the number of tags that the search result has. In this embodiment, when the user's mouse hovers over this graphical icon, a graphical bubble (e.g., graphical icon 414b, discussed in FIG. 4B) is presented to display the graphical icons associated with users who have tagged this search result. For example, the graphical icons associated with a user who has tagged the search result can be a profile picture from the tagger's social media, as well as indication whether the tagger is connected to the user via social media, as discussed in greater detail with regard to FIGS. 4A-4D. A graphical icon having a "plus sign" denotes multiple taggers. In response to a user selecting the plus sign graphical icon, icons associated with the users who have tagged the search result (e.g., profile pictures from a social media outlet) can be displayed. In other embodiments, when the user's mouse hovers over the URL of a tagged search result, a preview of the tagged search result can be displayed.

In other embodiments, search enhancer 112 can organize and display the ordered search results in a single downloadable content. In other words, search enhancer 112 can organize and display the ordered search results as a document, displaying content of the tagged search results rather than web links to the tagged content. For example, where a previous user has tagged "Section II" as being the relevant portion of Website A, search enhancer 112 can reproduce the tagged content of Website A (e.g., "Section II") in a single downloadable content, as opposed to providing the web link to Website A that directs the user to the tagged content of Website A.

In yet other embodiments, display options can also include the option to depict tagged search results beyond a list view that is ordered. For example, display options can include making available to a user, a view of the tagged search results as a word cloud (e.g., the font size depicts a highest calculated average).

FIGS. 4A-4D are a collection of example screenshots illustrating the tagging and displaying of search results, in accordance with an embodiment of the present invention. In this example, a user is using a web search tool (e.g., search tool 110) to enter a query and conduct a search. The web search tool includes a search enhancer (e.g., search enhancer 112) that provides the capability of tagging search results (i.e., portions of content returned by search tool 110) as well as the capability of influencing search results returned by search tool 110 by searching previously tagged search results, and ranking and ordering the previously tagged search results to return content that is more relevant to the user.

Figure 4A:
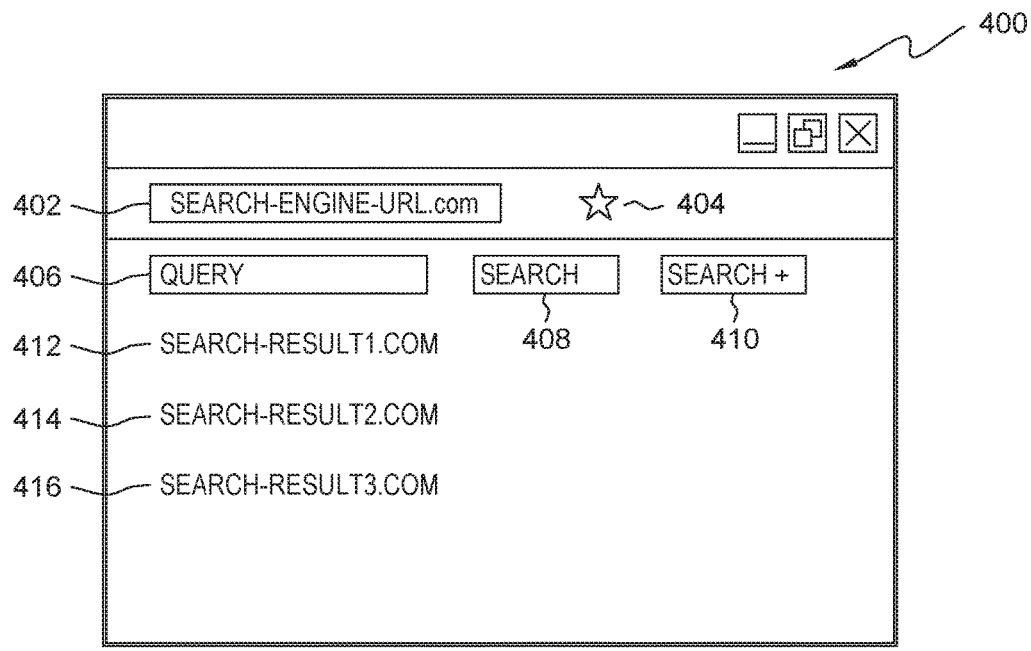
FIGS. 4A-4D are a collection of example screenshots illustrating tagging and displaying of search results, in accordance with an embodiment of the present invention.

FIG. 4A is an example screenshot 400 of a search conducted by a user using a web search tool, in accordance with an embodiment of the present invention. In this example, screenshot 400 depicts a web browser. Text box 402 represents an input field where the URL of a web search engine is displayed. Graphical button 404 represents a graphical button that can be used to tag a search result. Text box 406 represents an interactive text field (e.g., a search bar) into which a query can be inputted and displayed. Graphical button 408 represents a search button to submit a query to the web search engine (e.g., search tool 110), whereas graphical button 410 represents a search button to submit a query to the search enhancer (e.g., search enhancer 112).

Link 412, 414, and 416 represent URLs of search results. In this example, User A uses a web browser to connect to the web search engine (e.g., search tool 110). In this example, the query being searched for is input into, and displayed on, text box 406 (i.e., the search bar). Link 412, 414, and 416 are the search results returned in response to the submitted query. In this example, link 412, 414, and 416 are generated without the influence of database 104 or search enhancer 112.

Figure 4B:
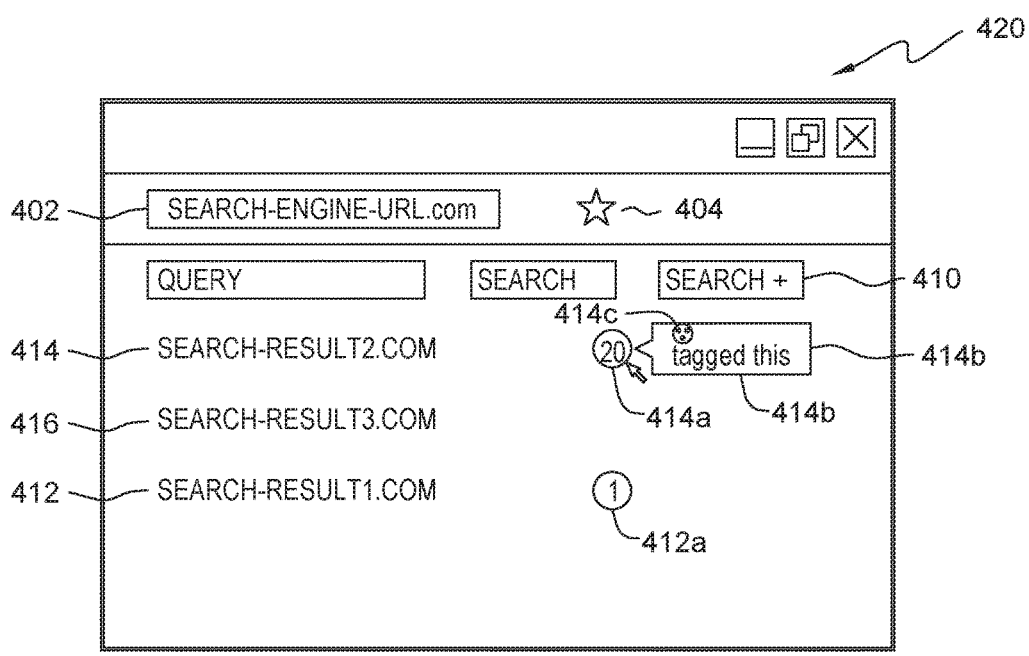

FIG. 4B is an example screenshot 420 of a search conducted by User A with the use of the search enhancer, in accordance with an embodiment of the present invention. In this example, screenshot 420 depicts a web browser. Graphical icons 412a and 414a represent tag count icons that display the number of users who have tagged a corresponding search result. Graphical icon 414b represents an icon that can display metadata associated with tag (e.g., the graphical icon(s) associated with user(s) who tagged the corresponding search result, the name(s) of the user(s) who tagged the corresponding search result, and an indication of whether the user is connected to the tagger(s) via a social media outlet).

In this example, User A has submitted a query to the search enhancer (e.g., search enhancer 112), via enhanced search button (e.g., graphical button 410), resulting in the display of link 412, 414, and 416. Link 412, 414, and 416 (e.g., the search results) are displayed with the influence of the search tool enhancer (e.g., search enhancer 112), and correspond to tagged searches present in the database (e.g., database 104). In this example, the order of links 412 through 416 is based, at least in part, on the user preferences of User A. In this example, search enhancer 112 has reordered link 412, 414, and 416 to display search results based on their perceived relevance.

In this example, relevance is determined by the ranking methodology that specifies that the tagged search result with the most amount of tags is identified as the most relevant tagged search result. Link 414 is displayed first, indicating that the user preferences of User A suggest link 414 is the most relevant search result for User A. In this example, the numbers "1" and "20", inscribed in graphical icon 412a and 414a respectively, indicate that one and twenty users have tagged link 412 and 414, respectively.

In this example, the user or users that tagged respective links (i.e., search results) 412 and 414 are not connected via a social media outlet to User A. Graphical icon 414b is shown as being displayed as a "pop up" bubble that is displayed when icon 414a is selected (e.g., when the user's mouse hovers over 414a). Graphical icon 414b displays graphical icon 414c that denotes an icon with a "plus sign" that indicates that multiple users (e.g., twenty, as indicated by graphical icon 414a) have tagged content found in link 414. In response to a user selecting graphical icon 414c, search enhancer 112 can display graphical icons associated with taggers (e.g., users) who have tagged the search result (e.g., link 414).

Graphical icon 414b can also display other types of metadata associated with the tagged search results. For example, graphical icon 414b can display the name of the user or users who tagged search result 414 (not shown) and an indication of whether the user is connected to the tagger via a social media outlet (also not shown). As shown, there is no indication that User A is connected via a social media outlet to the tagger who tagged search result 414.

In other embodiments, other types of metadata associated with the tagged search results can be displayed by graphical icon 414b. For example, a graphical icon (e.g., graphical icon 414b) can display metadata related to the tagger's perceived credibility, the number of search results the tagger has tagged, and the date and time that the search result was tagged. In other embodiments, graphical icon 414b can display metadata related to the tagger's demographics such as the tagger's age, occupation, or geographical location.

Figure 4C:
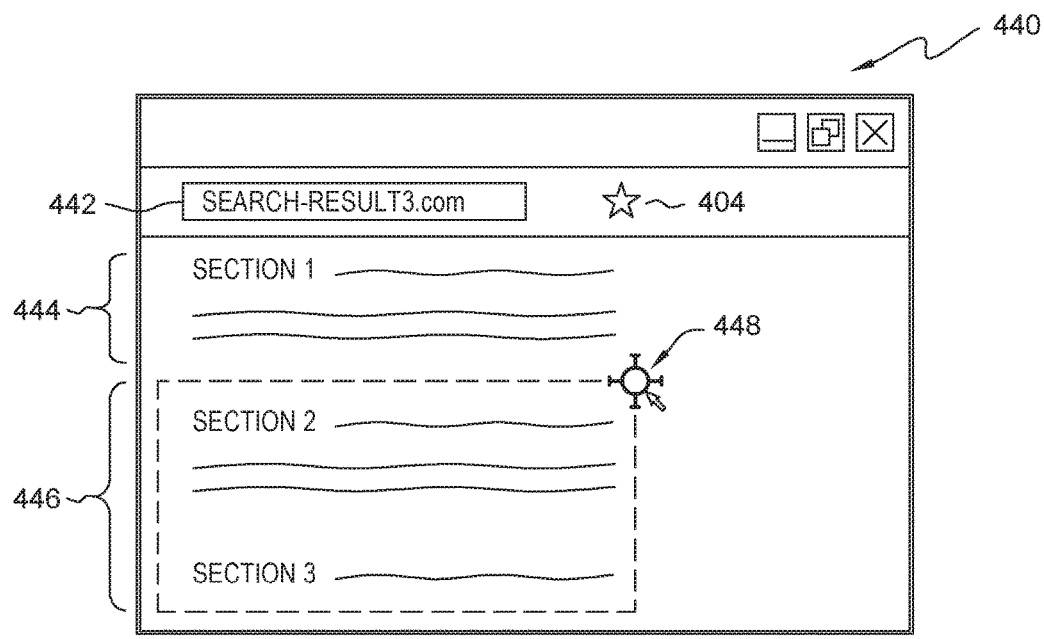

FIG. 4C is an example screenshot 440 that shows User A tagging web content, in accordance with an embodiment of the present invention. In this example, screenshot 440 depicts a web browser (e.g., search tool 110) displaying the webpage associated with link 416, which is a search result returned to the user using a search enhancer (e.g., search enhancer 112) in response to the user's query. In this example, User A has chosen to tag (i.e., indicate as fulfilling the request for information represented by the query) content displayed on the web page that link 416 provides.

Text box 442 represents an input field where a URL corresponding to link 416 is displayed. Sections 444 and 446 represent portions of web content that correspond to the webpage associated with link 416. Graphical icon 448 denotes a selection icon used to select sections of a search result. User A has pressed graphical button 404 to begin the process of tagging a portion (i.e. section 446) of web content displayed on the web page.

Graphical button 404 provides an option (not shown) to tag the entire webpage of web content corresponding to the URL displayed by text box 442. Graphical button 404 also provides an option to tag a section of the web content as specified by the user. As shown, User A has selected the option to tag a section of the web content, causing graphical icon 448 to appear next to the user's mouse. User A can then tag section 446 by clicking and dragging the mouse over the desired content, as indicated by the rectangle formed by the dashed lines. The tagged section of the webpage is then added to database 104.

Figure 4D:
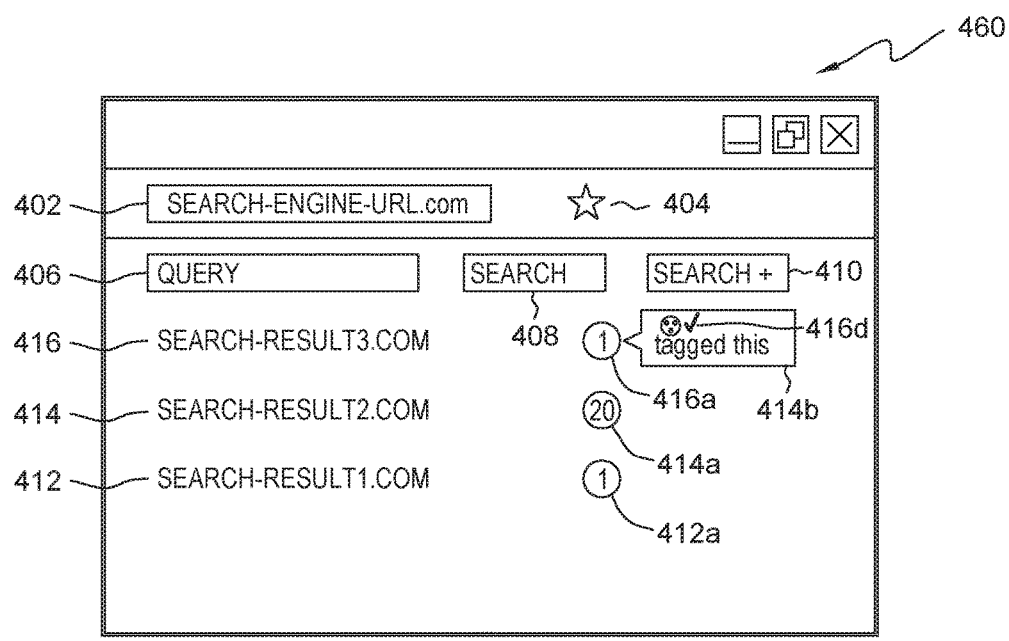

FIG. 4D is an example screenshot 460 that shows a search conducted by a different user and returned tagged search results that are influenced by a search enhancer, in accordance with an embodiment of the present invention. In this example, a different user, User B, has chosen to use a search enhancer (e.g., search enhancer 112) via graphical button 410. The previously tagged search results (e.g., from the search conducted by User A in the previous examples) that fulfill the query (e.g., the query from User B) are prioritized based, at least in part, on the user's preferences. In this example, the tagged search results are prioritized based on social media relationships of User B, that is, a methodology in which users that are connected to User B are displayed first (e.g., User A's tag is prioritized higher than an unconnected third party user), as opposed to a methodology based on the number of users who have tagged the search results, (e.g., the search result prioritized first is the tagged search result with the most number of users who have tagged content associated with the tagged search result).

In this example, screenshot 460 depicts a web browser. Graphical icons 412a, 414a, and 416a display the number of users that have tagged the correspond link (i.e., the corresponding tagged search result). Graphical icon 416d is an icon in the shape of a check mark that indicates the user who has tagged the link is connected to the user (e.g., User B) via a social media outlet. In this example, the user who previously tagged the link is User A. Graphical icon 416d shows that User A is connected to User B via a social media outlet.

As mentioned previously, User B's user preferences indicate that search results tagged by those connected to User B via a social media outlet should be weighted higher than search results tagged by users who are not connected to User B via a social media outlet. Given these user preferences, search enhancer 112 has reordered the search results (e.g., links 412 through 416) to display link 416, which was tagged by User A, before link 412 and 414, which were not tagged by a user, or users, connected, via a social media outlet, to User B. Link 414 is displayed next as it has the highest number of users that have tagged content (e.g., twenty users shown by graphical icon 414a) associated with the web page link 414 directs to. Link 416 is displayed last as link 416 only has one user (shown by graphical icon 412a) that has tagged content associated with the web page that link 416 directs to.

In this example, the perceived relevance of the search results determined by the search tool is opposite to the perceived relevance determined by the search enhancer. This is exemplified by the opposite ordering in which link 412, 414, and 416 are displayed in FIG. 4A (i.e. using the search tool) and FIG. 4D (i.e. using the search enhancer).

Figure 5:
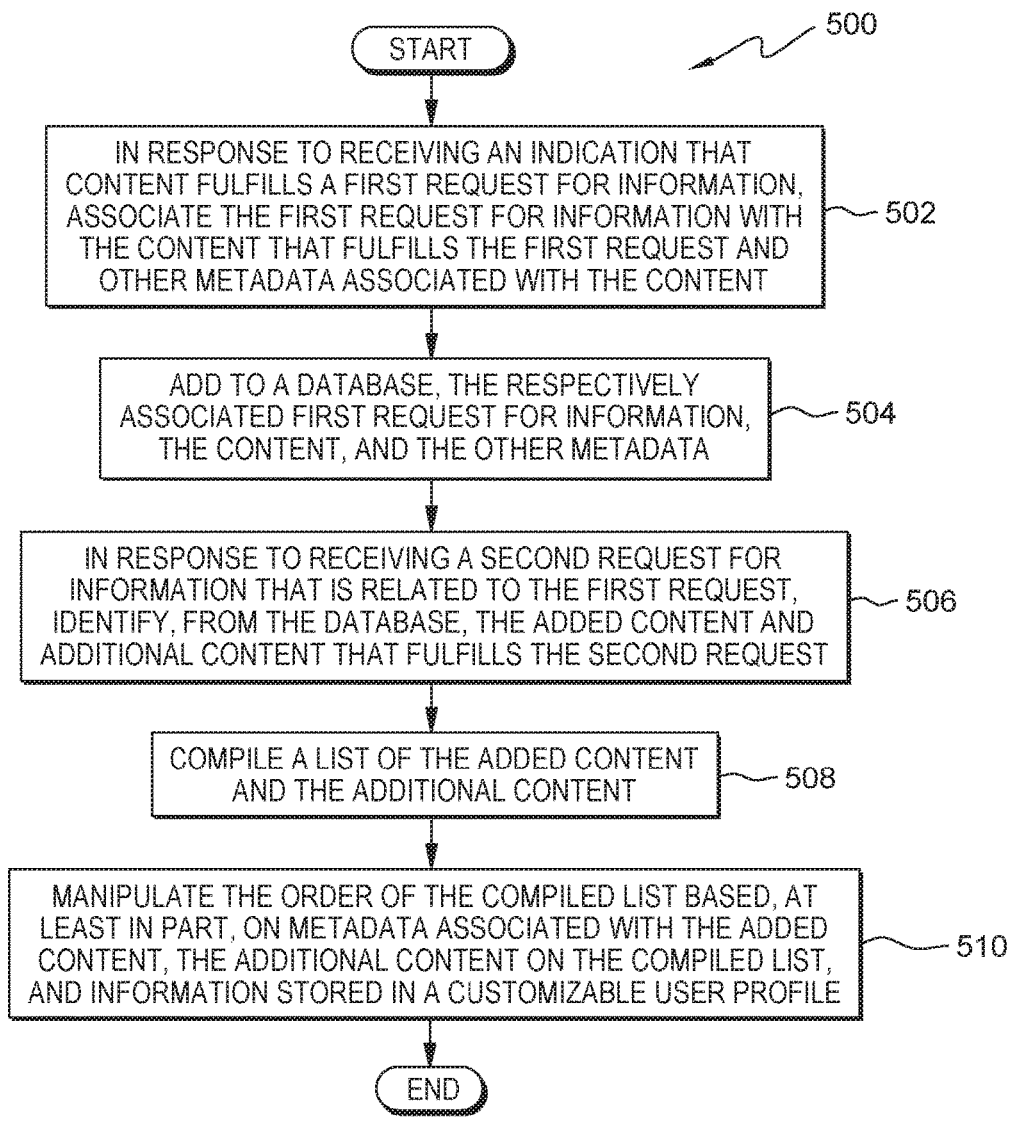
FIG. 5 is another flowchart that is helpful in illustrating operational steps for tagging and influence search results, in accordance with an embodiment of the present invention.

FIG. 5 is another flowchart 500 that is helpful in illustrating operational steps for tagging and influence search results, in accordance with an embodiment of the present invention.

In step 502, search enhancer 112 associates a first request for information (i.e. a first query) with content that fulfills the first request and other metadata associated with the content in response to receiving an indication that the content fulfills the first request. In this embodiment, search enhancer 112 associates the first request for information with content that fulfills the first request automatically by pairing the content (as identified by the indication) with the query associated with the first request for information. In other embodiments, a user can "tag" a query (i.e., the request for information) by marking it or otherwise indicating that the query corresponds to a tagged search result. For example, User A presents a query for "new sedans". The query is searched for and, upon receiving a search result (e.g., Website 1), User A flags specific portions of Website 1 relevant to the user's query for "new sedans". Following this example, the corresponding query (i.e., "new sedans") is linked with the tagged search result (i.e., the specific portions of Website 1) and both are added to database 104.

In step 504, search enhancer 112 adds to a database the respectively associated first request for information, the content, and the other metadata. In this embodiment, search enhancer 112 adds to a database (i.e. database 104) the respectively associated first request (i.e., the first query) for information, the content, and the other metadata by transmitting this information to server computer system 102 via network 106. Once transmitted, server computer system 102 stores the information in database 104. For example, given the query "New movies" and a corresponding search result tagged by the user who searched for the query "New movies" search enhancer 112 can transmit this query, the tagged search result, and metadata associated with the tagger, to database 104. An example of the metadata associated with the tagger can include the social media outlets that the tagger is a member of, the time and date that the tagger tagged the search result, the geographical location where the tagger tagged the search result, the demographics of the tagger, and the perceived credibility of the tagger.

In step 506, search enhancer 112 identifies from the database the added content and additional content that fulfills a second request (i.e. a second query) in response to receiving a second request for information that is related to the first request. In this embodiment, search enhancer 112 identifies from the database the added content and the additional content by generating a list of requests for information that are related to the second request, and searching database 104 for entries that match the second request as well as any request on the generated list of related requests. For example, in response to the request for information "What's in theaters now?", search enhancer 112 can generate a list of related requests such as, "New movies" and "What movies are playing now." With the generated list of related requests, search enhancer 112 can search database 104 for requests matching the second request as well as any request on the generated list of related requests. Following this example, because one of the generated requests (i.e. "New movies") matches the request that corresponds to the added content (i.e. the content added in response to the first request) search enhancer 112 can identify the added content. Search enhancer 112 can also identify "additional content", which refers to content added to the database corresponding to a request other than the second request. For example, additional content can be content associated with the generated request for information "What's in theaters now?" or "What movies are playing now".

In step 508, search enhancer 112 compiles a list of the added content and the additional content. In this embodiment, search enhancer 112 maintains a list of the added content and additional content identified from the database that matches the second request for information or any request on the generate list of requests related to the second request.

In step 510, search enhancer 112 manipulates the order of the compiled list based, at least in part, on metadata associated with the added content and the additional content on the compiled list, and information stored in a customizable user profile. In this embodiment, search enhancer 112 manipulates the order of the list by consulting the user's preferences, which are stored in the customizable user profile. Search enhancer 112 determines the user's preferred content display scheme from the user preferences and manipulates the order of the compiled list to reflect the preferred scheme. For example, the user's preferences can indicate that the user wishes to prioritize the display of content that was tagged by taggers who belong to the same age group as the user. In this example, search enhancer 112 can determine which content on the compiled list reflects this preference by consulting the metadata associated with the added content and additional content, which includes, metadata about the tagger such as tagger's social media outlets, geographical location, age, and occupation.

Figure 6:
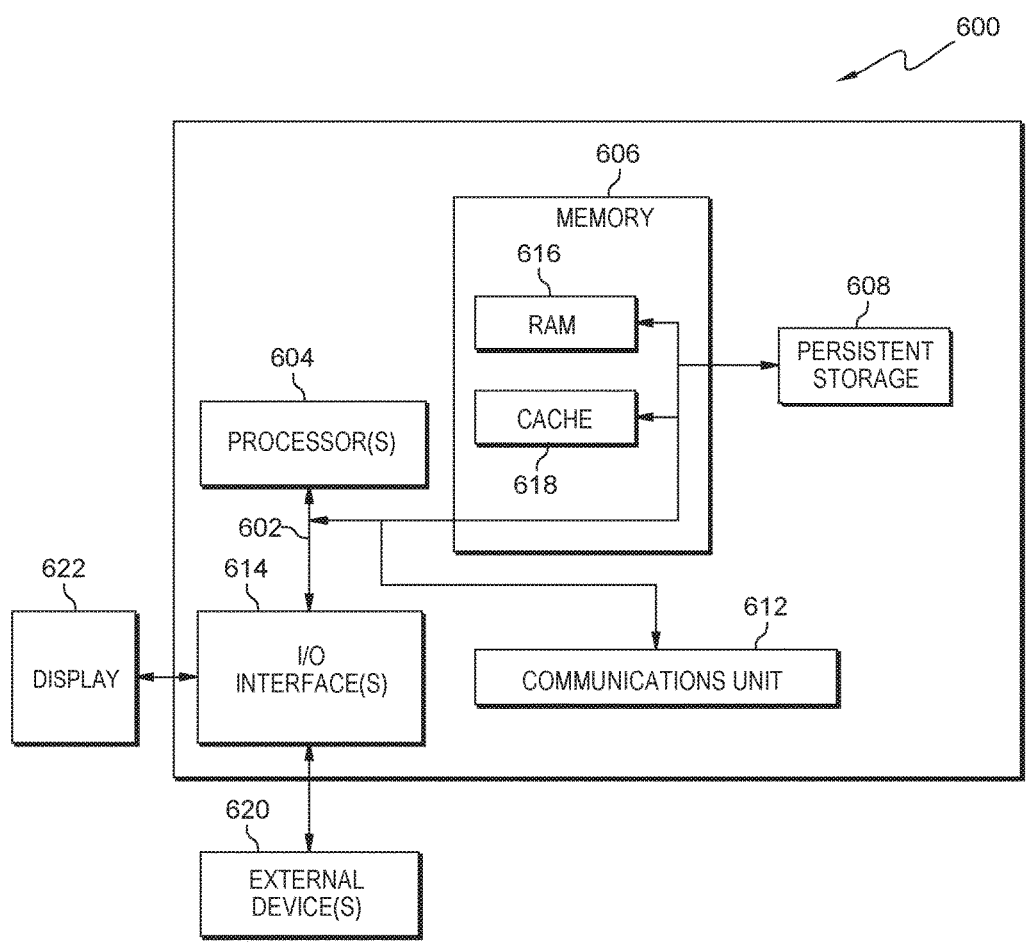
FIG. 6 is a block diagram of internal and external components of the computer systems of FIG. 1, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 106). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 108 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   providing an option for a first user to select content as an indication that the selected content that fulfills a first request for information, wherein the selected content that fulfills the first request comprises:
   webpages, applications, PDFs, images, video, audio, holograms, sections of webpages, sections of applications, sections of PDFs, sections of images, sections of video, sections of audio, sections of holograms, and data processed documents;

in response to receiving an indication that content fulfills a first request for information, associating the first request for information with the content that fulfills the first request collecting metadata from the selected content with the first request for information, wherein the metadata reflects information associated with the first user, wherein the metadata includes:
   social media outlets the first user is a member of, a time and date when the first user selected content, geographic location of the first user when the first user selected content, demographics of the first user, and a perceived credibility of the first user;

adding to a database the respectively associated first request for information, the content, and the metadata associated with the first user;

in response to receiving a second request for information that is related to the first request, identifying, from the database, the added content and additional content that fulfills the second request, wherein identifying, from the database, the added content and additional content that fulfills the second request comprises:
   generating a list of requests for information that are related to the second request for information,
   searching the database for the second request of information and the generated list of requests, and
   identifying, from the searched database added content and additional content that fulfills the second request and the generated list of requests;

compiling a list of the added content and the additional content;

manipulating the order of the compiled list based, at least in part, on metadata associated with the added content, the additional content identified from the database, and metadata stored in a customizable user profile, wherein:
   metadata associated with the added content and the additional content on the compiled list comprises:
      a group of users that have indicated the added content fulfills the second request, a time and date that each user from the group of users indicated the added content fulfills the second request, a time and date that the added content was added to the database, a credibility of each user from the group of users that indicated the added content fulfills the second request, and a list of social media outlets to which each user from the group of users is associated with,
   wherein metadata stored in a customizable user profile comprises:
      social media outlets, geographical location, age, and occupation, and preferences that indicate preferred content displays associated with the customizable user profile, and
   wherein manipulating the order of the compiled list based, at least in part, on metadata associated with the added content, the additional content identified from the database, and metadata stored in a customizable user profile comprises:
      determining one or more ranking methodologies based, at least in part, on preferences that indicated preferred content displays stored in the customizable user profile, wherein the one or more ranking methodologies is selected from a a group, the group consisting of:
         ranking the added content and the additional content based on a threshold amount of tags associated with the added content and the additional content,
         ranking the added content and the additional content based on a determination of a most recent tag of content the added content and the additional content,
         ranking the added content and the additional content based on a relationship between the first user that indicated that the added content fulfills the first request for information and a second user that generated the second request for information,
         ranking the added content and the additional content based on credibility of the user that indicated that the added content fulfills the first request for information,
         ranking the added content and the additional content based on demographics of the user that generated the second request for information, and
         ranking the added content and the additional content based on previous indications generated by the user that generated the second request for information;
      ranking the added content and the additional content by prioritizing the added content and the additional content with associated metadata according to the one or more determined ranking methodologies, and
      reordering the added content and the additional content based on the rank associated with the added content and the additional content;

providing an option to indicate that content of the manipulated list fulfills the second request for information;

providing a graphical button to register an assertion of the option;

in response to receiving the assertion of the option, adding to the database the second request for information, the content, and metadata associated with the indication that the content of the manipulated list fulfills the second request for information; and displaying the added content, the additional content, and metadata associated with the indication that the content of the manipulated list fulfills the second request for information, wherein displaying the added content, the additional content, and metadata associated with the indication that the content comprises organizing and displaying the added content, the additional content, and metadata associated with the indication that the content of the manipulated list fulfills the second request for information in a single downloadable content.

* * * * *